US009898042B2

(12) United States Patent
Abbott

(10) Patent No.: US 9,898,042 B2
(45) Date of Patent: Feb. 20, 2018

(54) SMART DEVICE DOCKING APPARATUS

(71) Applicant: Michael Abbott, Rockville, MD (US)

(72) Inventor: Michael Abbott, Rockville, MD (US)

(*) Notice: Subject to any disclaimer, the term of this patent is extended or adjusted under 35 U.S.C. 154(b) by 0 days.

(21) Appl. No.: 15/206,959

(22) Filed: Jul. 11, 2016

(65) Prior Publication Data

US 2017/0010632 A1    Jan. 12, 2017

Related U.S. Application Data

(60) Provisional application No. 62/190,487, filed on Jul. 9, 2015.

(51) Int. Cl.
| | | |
|---|---|---|
| F16M 11/00 | (2006.01) | |
| G06F 1/16 | (2006.01) | |
| H04M 1/04 | (2006.01) | |

(52) U.S. Cl.
CPC .......... *G06F 1/1632* (2013.01); *F16M 11/00* (2013.01); *H04M 1/04* (2013.01)

(58) Field of Classification Search
CPC .......... A47B 2200/0085; G06F 1/1601; G06F 1/1626; G06F 1/1632; F16M 11/041; F16M 11/14; F16M 13/022; F16M 2200/027; F16M 2200/022; F16M 2200/068; F16M 2200/00; F16M 2200/021; F16M 13/02
USPC ............. 248/693, 121, 123.11, 123.2, 124.1, 248/125.1, 125.8, 160, 161, 162.1, 157, 248/176.1, 447.2, 447.1, 229.15, 229.1, 248/689; 292/256
See application file for complete search history.

(56) References Cited

U.S. PATENT DOCUMENTS

| | | | | | |
|---|---|---|---|---|---|
| 3,395,883 | A | * | 8/1968 | Murgas | ................... B60R 1/078 248/229.1 |
| 4,957,318 | A | * | 9/1990 | Blatt | ................... B65G 47/917 248/205.9 |
| 6,464,555 | B1 | * | 10/2002 | Paduano | .............. A63H 33/006 446/227 |
| 6,967,632 | B1 | * | 11/2005 | Minami | ................. F16M 11/08 345/1.3 |
| 7,458,555 | B2 | * | 12/2008 | Mastropaolo | .......... A47B 23/02 248/160 |
| 8,317,146 | B2 | * | 11/2012 | Jung | ...................... G06F 1/1601 248/125.7 |
| 8,480,044 | B2 | * | 7/2013 | Liao | ....................... F16B 47/00 248/205.5 |
| 8,800,942 | B2 | * | 8/2014 | Yu | ........................ F16M 11/14 248/122.1 |
| 8,864,089 | B2 | * | 10/2014 | Hung | ................... F16M 11/041 248/122.1 |

(Continued)

*Primary Examiner* — Nkeisha Smith
(74) *Attorney, Agent, or Firm* — Dunlap Bennett & Ludwig PLLC

(57) ABSTRACT

A docking apparatus is provided. The docking apparatus includes a host mount and a smart device mount. The host mount includes a base plate. At least one hinge clip is pivotally secured to the base plate by a binder post. The hinge clip is resiliently biased towards the base plate by a spring. A turn table is secured to an upper surface of the base plate and rotatable about a first axis. A hinge arm includes a first end pivotally attached to an upper surface of the turn table. The first end is rotatable about a second axis, such as a horizontal axis, substantially perpendicular to the first axis. The smart device mount is secured to a second end of the hinge arm and is operable to releasably retain a smart device.

10 Claims, 7 Drawing Sheets

(56) References Cited

U.S. PATENT DOCUMENTS

| | | | |
|---|---|---|---|
| 8,925,877 B2* | 1/2015 | Carnevali | B60R 11/0252 248/122.1 |
| 8,967,561 B2* | 3/2015 | Cheng | F16M 11/041 248/176.1 |
| 8,979,040 B2* | 3/2015 | Chien | F16M 13/00 248/121 |
| 9,004,419 B2* | 4/2015 | Nakatani | F16M 11/126 248/178.1 |
| 9,016,658 B2* | 4/2015 | Barnard | F16M 11/041 248/688 |
| 9,019,698 B2* | 4/2015 | Thiers | H04W 88/02 248/922 |
| 9,038,971 B1* | 5/2015 | Guthrie | F16M 13/022 248/121 |
| 9,103,492 B2* | 8/2015 | Springer | F16M 11/041 |
| 9,297,495 B2* | 3/2016 | Fischer | F16M 11/041 |
| 9,448,588 B2* | 9/2016 | Barnard | G06F 1/1626 |
| 9,450,634 B2* | 9/2016 | Rayner | G06F 1/163 |
| 9,476,439 B1* | 10/2016 | Liao | F16B 2/12 |
| 2012/0037771 A1 | 2/2012 | Kitchen | |
| 2012/0074272 A1* | 3/2012 | Hull | F16M 11/041 248/122.1 |
| 2012/0175474 A1* | 7/2012 | Barnard | F16M 11/041 248/122.1 |
| 2013/0119227 A1* | 5/2013 | Lin | F16M 11/041 248/689 |
| 2013/0135803 A1* | 5/2013 | Johnson | A47F 7/024 361/679.01 |
| 2013/0228662 A1* | 9/2013 | Green | G06F 1/1607 248/229.1 |
| 2013/0314890 A1* | 11/2013 | Smith | F16M 11/10 361/825 |
| 2015/0034778 A1* | 2/2015 | Lin | G06F 1/1613 248/124.1 |
| 2016/0312950 A1* | 10/2016 | Bowman | F16M 11/14 |
| 2016/0313630 A1* | 10/2016 | Elmohtaseb | G03B 17/561 |
| 2016/0317237 A1* | 11/2016 | Geiger | F16M 13/022 |

* cited by examiner

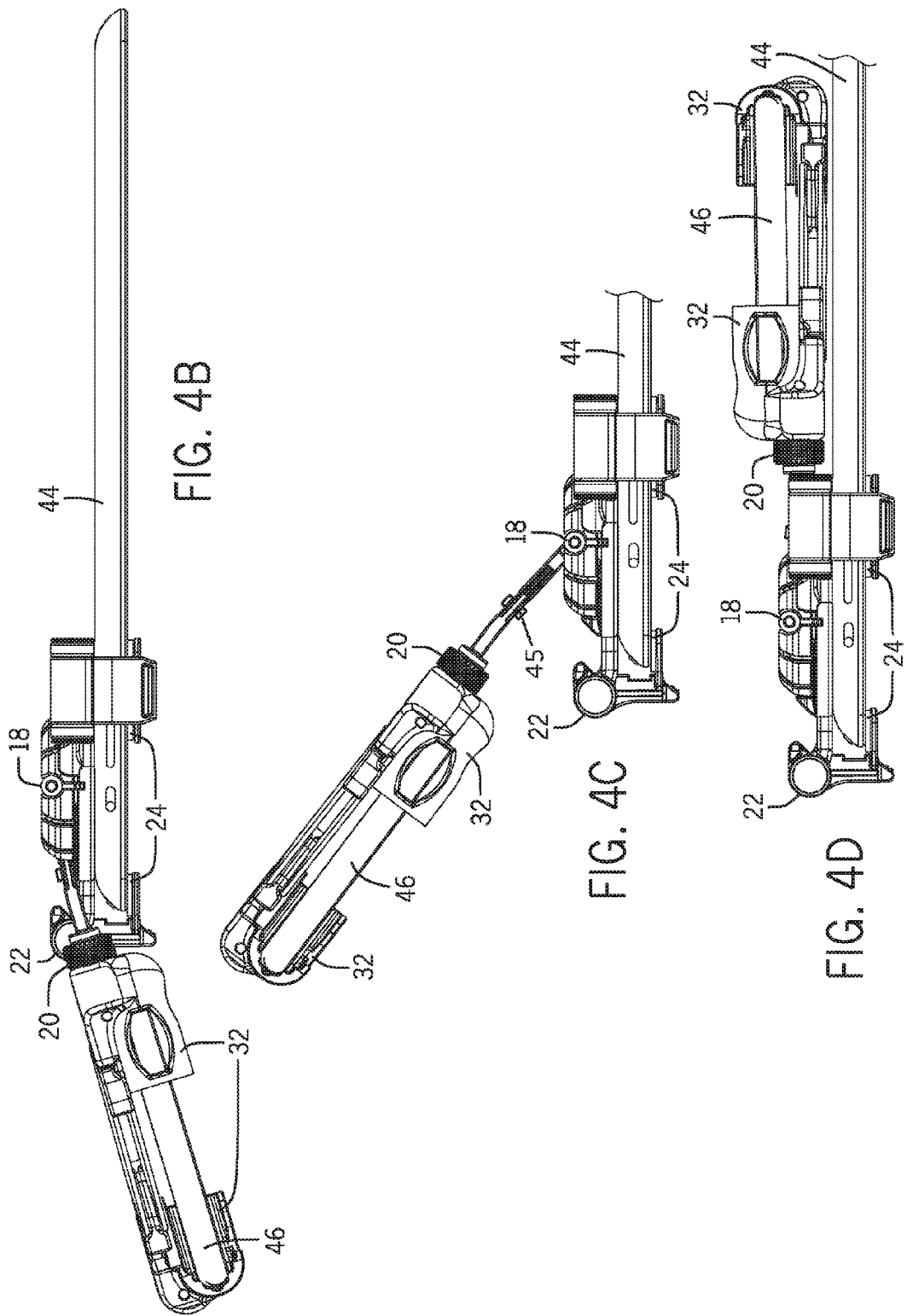

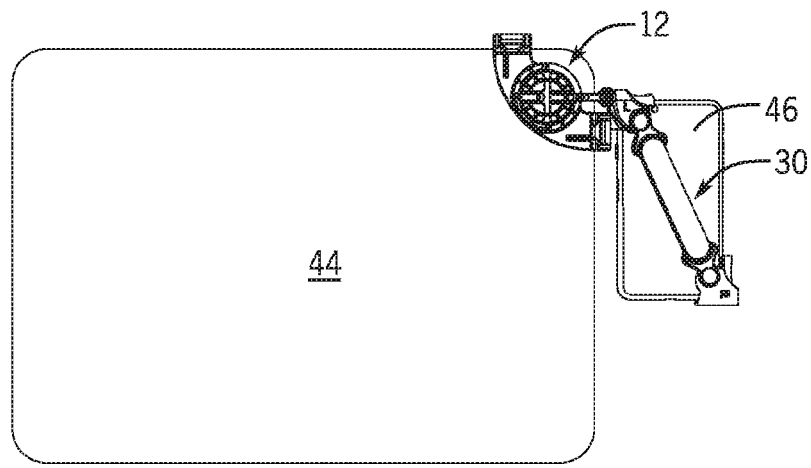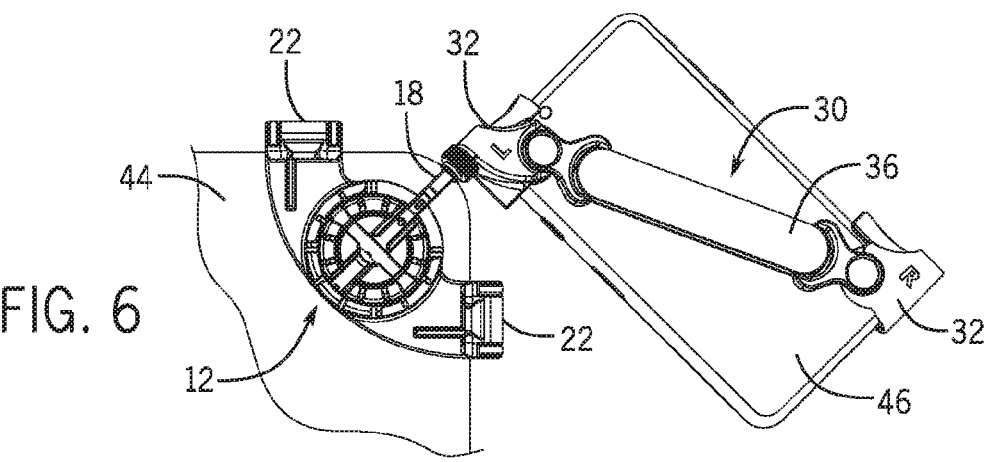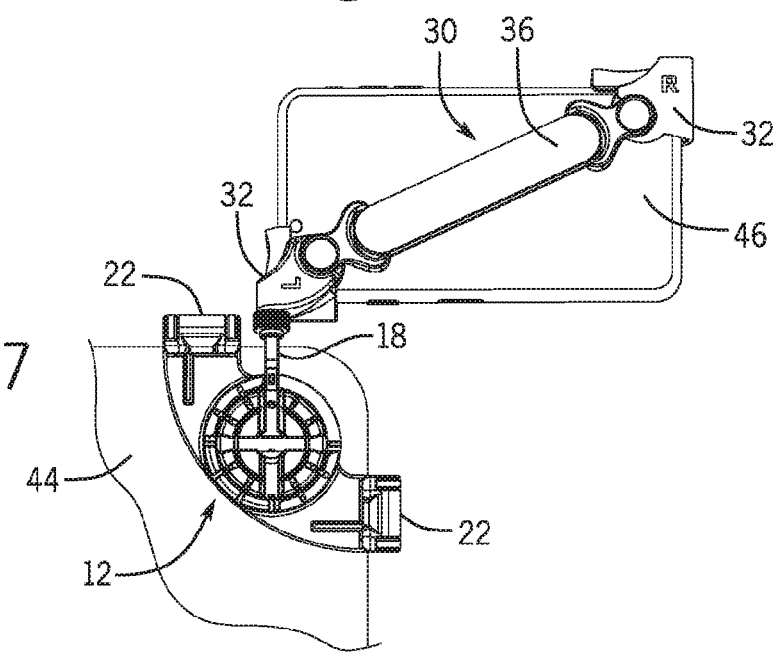

SMART DEVICE DOCKING APPARATUS

CROSS-REFERENCE TO RELATED APPLICATION

This application claims the benefit of priority of U.S. provisional application No. 62/190,487, filed Jul. 9, 2015, the contents of which are herein incorporated by reference.

BACKGROUND OF THE INVENTION

The present invention relates to mounting smart devices and, more particularly, to a smart device docking apparatus that mounts a smart device to a host device.

Students, office workers and professionals utilize a number of ubiquitous electronic tools in their daily lives, including a smart phone, and other portable devices such as a laptop computer, e-Reader, iPad® or other tablet. These other devices are hereinafter referred to as "host devices". During a typical workday, these tools accompany an individual everywhere they go, from desk to conference room and back, on business travel, in the classroom. Yet each tool is utilized, managed, and accounted for separately.

As can be seen, there is a need for a docking apparatus that mounts a smart device to a hose device.

SUMMARY OF THE INVENTION

In one aspect of the present invention, a docking apparatus comprises: a host mount comprising: a base plate; at least one hinge clip pivotally secured to the base plate by a binder post and resiliently biased towards the base plate by a spring; a turn table secured to an upper surface of the base plate and rotatable about a first axis; and a hinge arm comprising a first end pivotally attached to an upper surface of the turn table and rotatable about a second axis substantially perpendicular to the first axis; and a smart device mount secured to a second end of the hinge arm and operable to releasably retain a smart device.

These and other features, aspects and advantages of the present invention will become better understood with reference to the following drawings, description and claims.

BRIEF DESCRIPTION OF THE DRAWINGS

FIG. 4B is a side elevation view illustrating the present invention in an extended orientation;

FIG. 4C is a side elevation view illustrating the present invention in a partially collapsed orientation;

FIG. 4D is a side elevation view illustrating the present invention in a collapsed orientation;

FIG. 5 is a top plan view of an embodiment of the present invention in use;

FIG. 6 is a detail top place view of an embodiment of the present invention in use in a second orientation;

FIG. 7 is a detail top place view of an embodiment of the present invention in use in a third orientation;

DETAILED DESCRIPTION OF THE INVENTION

Figure 1:
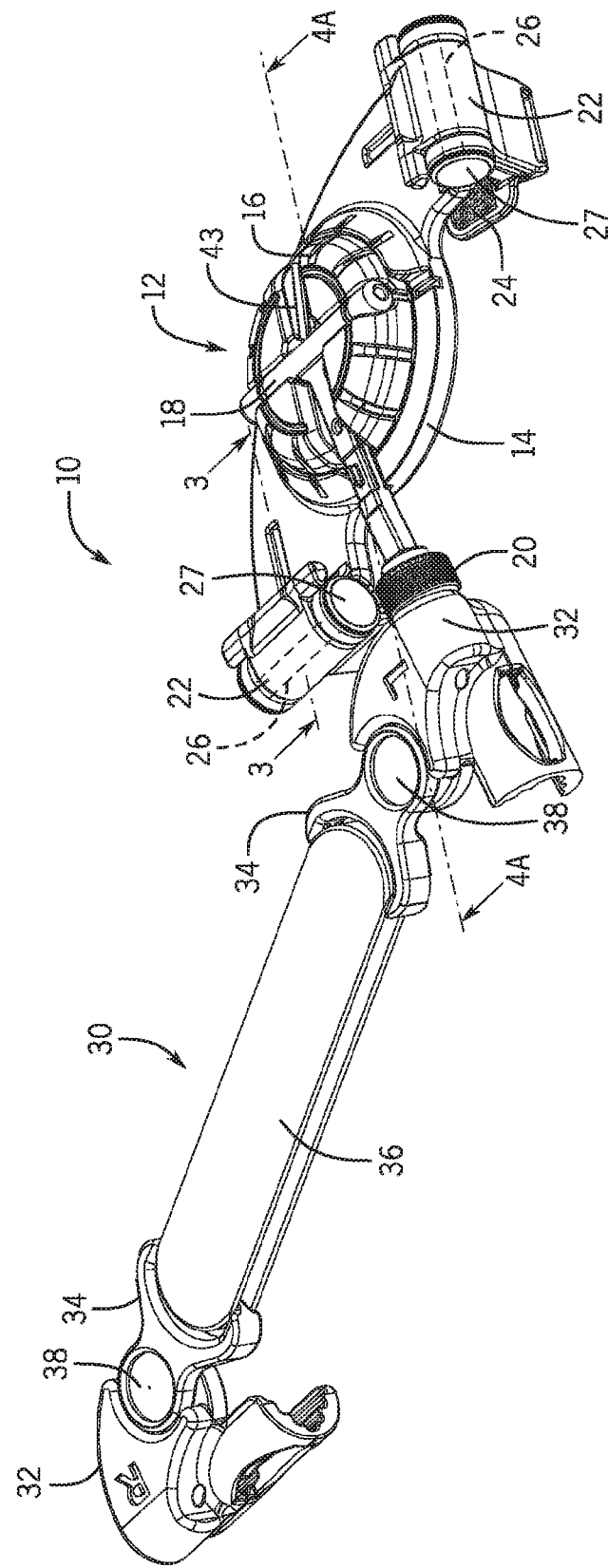
FIG. 1 is a perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a versatile, removable apparatus to securely dock a smart device to a host device. The smart device may include a smart phone or tablet. The present invention enables utilization and management of smart device and host device together. The present invention is utilized to attach the smart device to the host device, and to present the smart device in a variety of positions suitable either to utilize the smart device, or to secure it for transport together with the host device.

The present invention may include a base plate with a turn table. The turn table is placed bottom-down in the hollowed center of the circular component of the base plate. The hole at the center of the turn table is aligned vertically with the hole in the center of the circular component of the base plate. Guide pins extending from the bottom of the turn table are inserted in the guide track slots of the base plate. Binding post screw is inserted through aligned holes in the center of the turn table and the base plate. The binding post base is inserted through hole in the bottom of base plate, opposite the binding post screw. The binding post screw and base are threaded together and tightened, securing the turn table to the base plate. Torsion springs are inserted into hollowed cavities of the hinge clips, with about a ½ in. leg extending down into the hinge bracket and about a 1.0 in. leg extending horizontally through the open front of the hinge bracket cavity, and resting in the corresponding cutouts on top surface of base plate arms. Rubber bumpers are attached to shelf and vertical cutout of hinge clips. Circular cutouts on the hinge clips are aligned to cutouts on hinge holders at the end of each leg of the base plate. The binding post body is inserted through aligned cutouts on base plate hinge holders and the hinge bracket, and through the interior diameter of the torsion springs. Binding post head is threaded into binding post body, securing hinge clips to the base plate arms.

Adhesive rubber bumpers are attached to shallow extrusion on bottom surface of base plate. Hinge arm hinge pin is inserted into tubular slot on the turn table, and centered in the slot. Thumb nut is threaded onto the male threaded head of the hinge arm. The turntable is rotated within the 90-degree limits of guide pins inserted in guide pin slots of the base plate, to align hinge arm slots of the turn table with corresponding "In" or "Out" presentation positioning slots cut into the circular rim on the base plate. Hinge arm rotates through a 180-degree arc, coming to rest in aligned slots on the turn table and the base plate circular rim. Phone holder extensions are attached to connectors of the phone holder (right) and the phone holder (left) and secured with a 2-piece snap rivet. An elastic loop is inserted into the double-hooks on each of the phone holder extensions attached to the phone holder (right) and the phone holder (Left). The female threads on the phone holder (right) or (left) are threaded onto the hinge arm threads.

Host device is opened/oriented for normal use, with screen facing the user. The present invention is placed at the top-left or top-right corner of the host device, with the bottom of the base plate in contact with the back (non-screen) surface of the host device. Hinge clips rest on the top and side edges of the host device. Using thumb and fingers, hinge clips are rotated open wide enough to slide hinge bracket shelves onto the inside surfaces (screen side) of the host device. Once both hinge clips are attached, the bottom surface of the base plate rests against the back surface of the host device, and the present invention is secured in place by 1) clamping force on the hinge clips generated by torsion springs, and 2) friction generated by the non-slip silicone rubber bumpers on the bottom surface of the base plate, and on the shelves and vertical surfaces of the hinge clips.

Thumb nut is threaded onto hinge arm. Phone holder (Right) or (Left) is threaded onto the hinge arm. Thumb nut is tightened to apply pressure against the phone holder to secure the phone holder in position. The smart device is inserted into the phone holder such that one corner of the phone is inserted into phone holder (Right) and the opposite corner of the phone is inserted into phone holder (Left). The phone is secured by the elastic force exerted by elastic material connecting phone holder (Right) and (Left). Using the smart device as a handle, the hinge arm and the turn table are manipulated together to pivot and swivel the phone into any of the positioning slots cut into the rim of the base plate; "Out" positioning slots present the phone in portrait or landscape orientation next to the side, or above the top, of the host device; "In" positioning slots secure the phone back-to-back against the back surface of the host device. With the phone positioned this way, the smart device and host device can be transported safely and securely together. As circumstances require, the present invention can be re-positioned, via the attachment process described above, on either the top-left or top-right corner of the host device. Further, either phone holder (right) or (left) can be threaded on the hinge arm.

Figure 2:
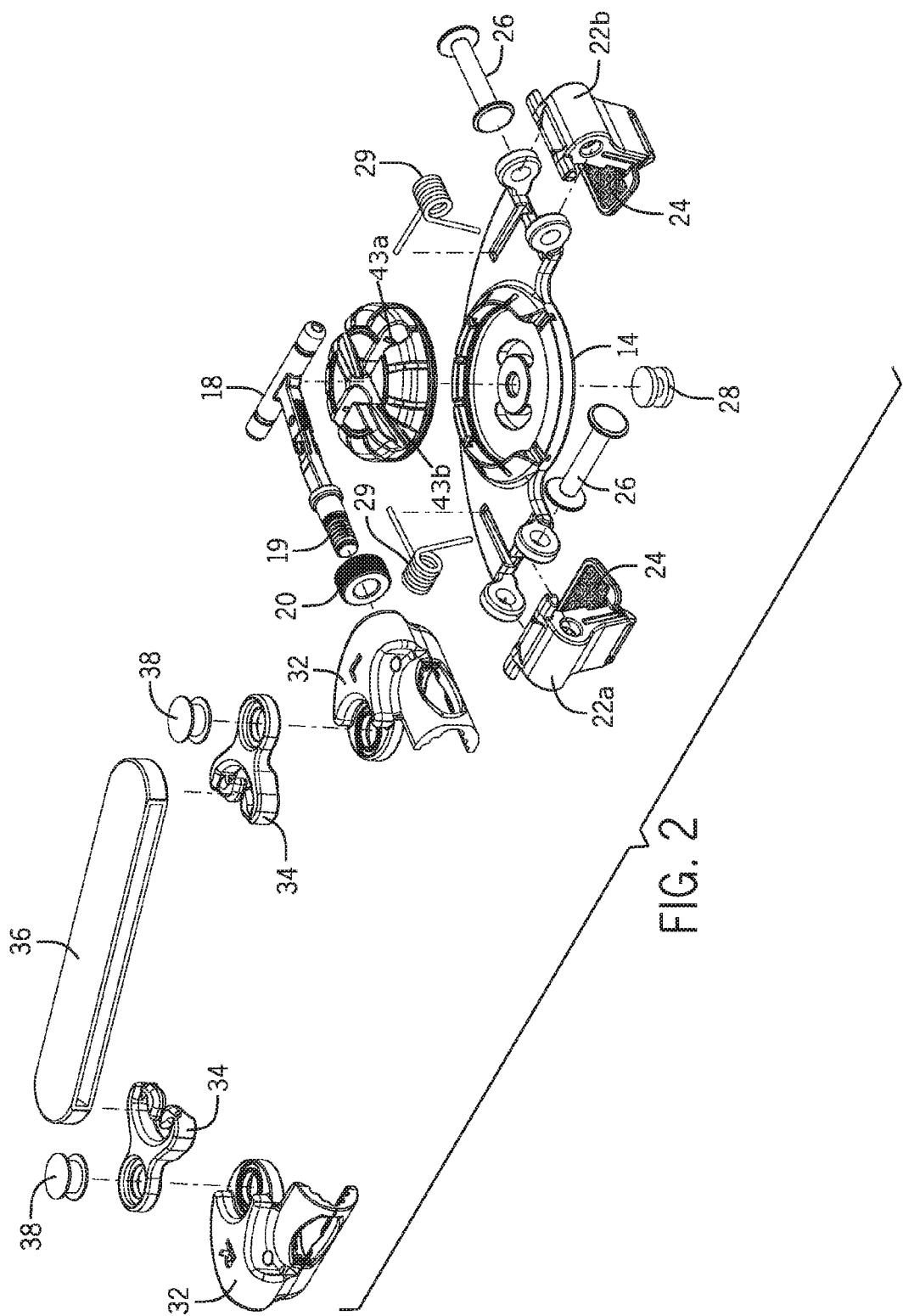
FIG. 2 is an exploded view of an embodiment of the present invention.
Figure 3:
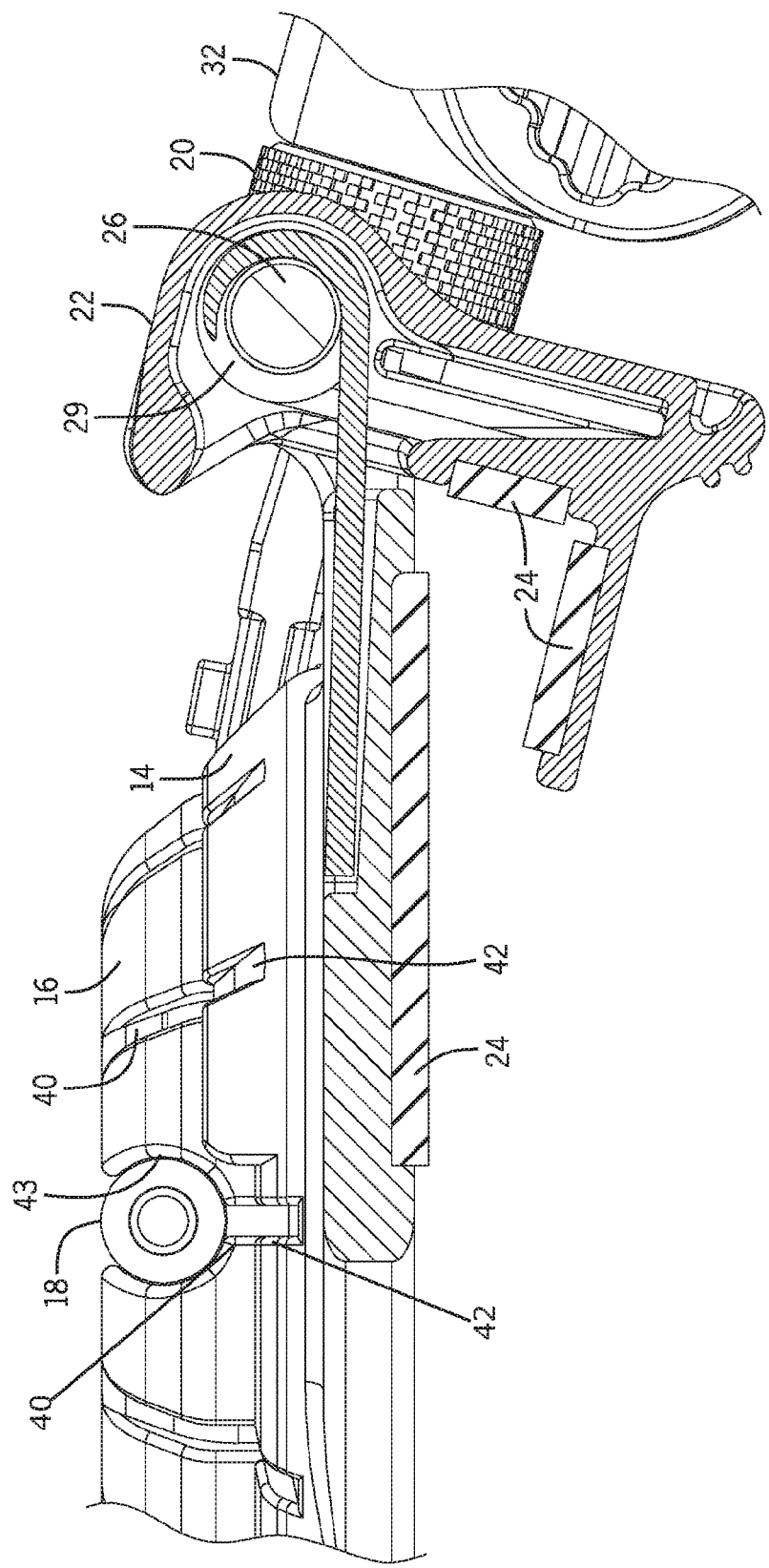
FIG. 3 is a cross-sectional view taken along line 3-3 in FIG. 1.
Figure 4A:
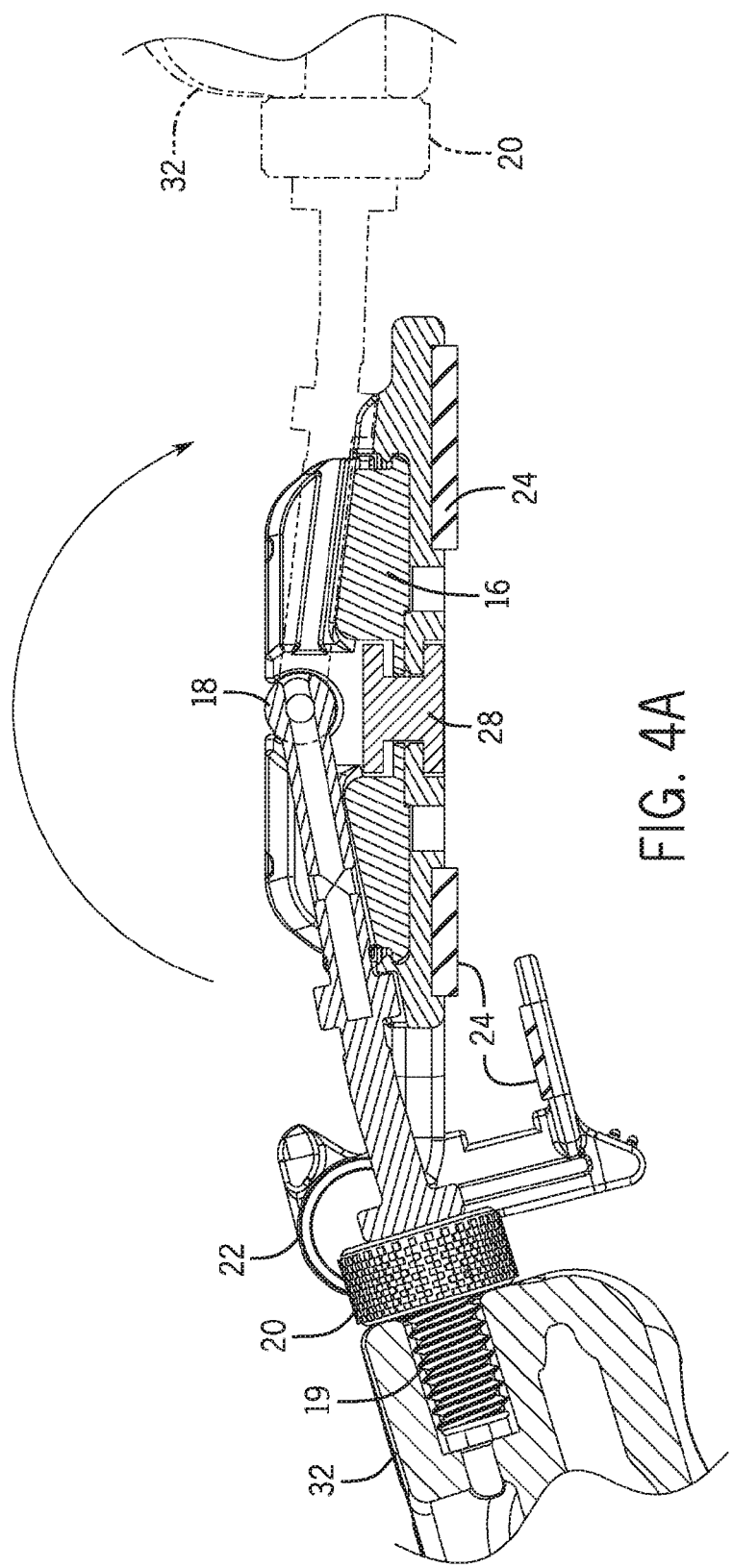
FIG. 4A is a cross-sectional view taken along line 4A-4A in FIG. 1.
Figure 8:
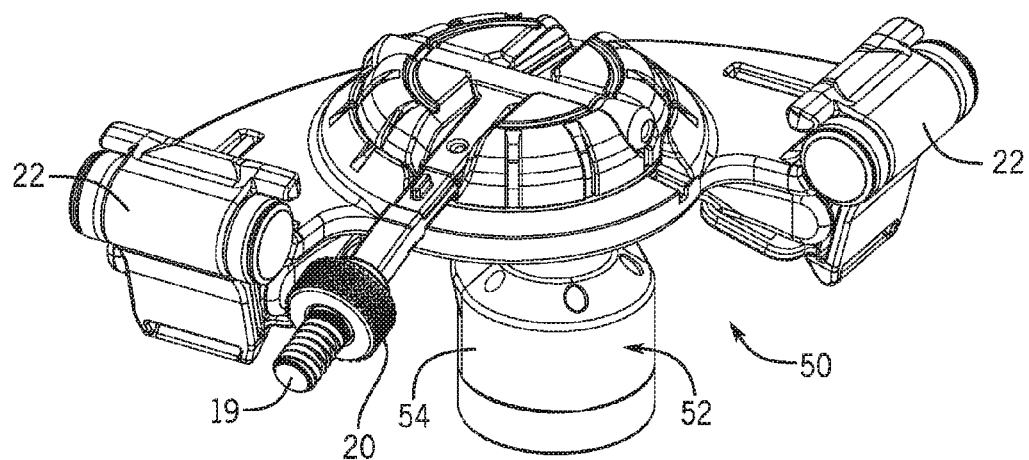
FIG. 8 is a perspective view of an embodiment of the present invention.
Figure 9:
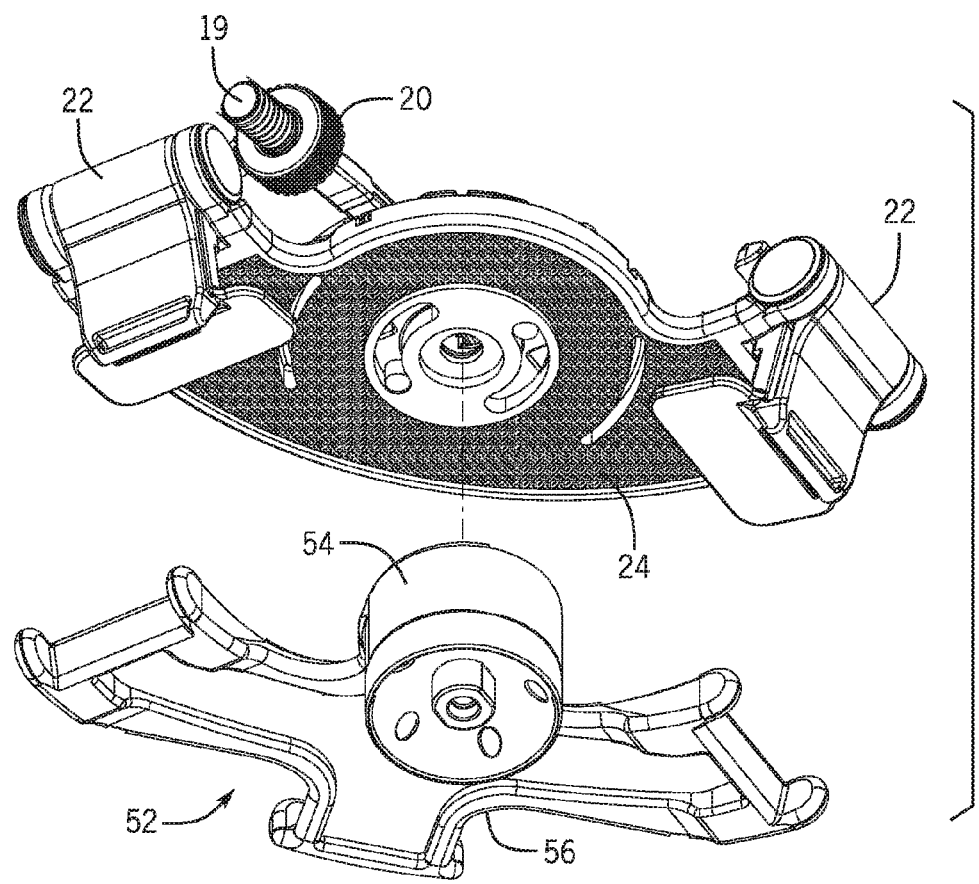
FIG. 9 is an exploded view of an embodiment of the present invention.

Referring to FIGS. 1 through 9, the present invention includes a docking apparatus 10. The docking apparatus 10 includes a host mount 12 and a smart device mount 30. The host mount 12 includes a base plate 14. A connector, such as at least one hinge clip 22, is pivotally secured to the base plate 14 by a binder post 26. The hinge clip 22 is resiliently biased towards the lower surface the base plate 14 by a spring 29, such as a torsion spring. A turn table 16 is secured to an upper surface of the base plate 14 by a binder post 28 and is rotatable about a first axis, such as a vertical axis running through the base plate 14. A hinge arm 18 includes a first end pivotally attached to an upper surface of the turn table 16. The first end is rotatable about a second axis, such as a horizontal axis, substantially perpendicular to the first axis. The smart device mount 30 is secured to a second end of the hinge arm 18 and is operable to releasably retain a smart device 46.

The hinge clip 22 of the present invention may open and close about the lower surface of the base plate 14. The at least one hinge clip 22 may include a first hinge clip 22*a* and a second hinge clip 22*b*. The first hinge clip 22*a* may be secured to a first end of the base plate 14 and the second hinge clip 22*b* may be secured to an opposing end of the base plate 14. In certain embodiments, a mouth of the first hinge clip 22*a* may be at about a 90 degree angle relative to a mouth of the second hinge clip 22*b*. Therefore, the base plate 14 may be mounted to a corner of a host device 44, such as a computer monitor. Each of the hinge clips 22 may also include a rubber bumper 24 secured within the mouth to add additional grip.

The hinge arm 18 may include a T shape having a pivot arm and an attachment arm. The turn table 16 may include grooves 43. The grooves 43 may include an intersecting first groove 43*a* and second groove 43*b*. The pivot arm is pivotally disposed within the first groove 43*a* and the attachment arm is sized to be disposed within the second groove 43*b*. The present invention may further include a locking mechanism operable to lock the turn table 16 in a plurality of different positions relative to the base plate 14. In such embodiments, the turn table 16 may include slots 40 formed within the grooves 43. The base plate 14 may include slots 42 that align with the slots 40 in each position. The attachment arm of the hinge arm 18 may include a locking peg 45 protruding from a bottom portion. The locking peg 45 may fit within the aligned slots 40, 42, locking the turn table 16 and the base plate 14 in position.

The smart device mount 30 may include a pair of jaws 32 operable to releasably secure the smart device 46 therebetween. One of the pair of jaws includes a threaded slot. The second end of the hinge arm 18 includes a male threaded end 19 releasably secured within the threaded slot. A thumbnut 20 may be used to tighten the hinge arm 18 to one of the pair of jaws 32. The pair of jaws may be resiliently retained together. In such embodiments, a band 36 having a rubber elasticity connects the pair of jaws 32 together. The band 36 may be secured to the jaws 32 by brackets 34 and snap rivets 38. The pair of jaws 32 may each be shaped to retain a corner of the smart device 46 within.

In certain embodiments, an alternate embodiment 50 may include a base unit 52. The base unit 52 may be secured to the lower surface of the base plate 14. The base unit 52 may include a hub 54 and a body portion 56. The base unit 52 is an adapter which substitutes for a host device enabling the present invention to be attached to other smartphone mounts, such as car mount, and used in situations in which a host device may not be available, such as when driving a car.

A method of using the present invention may include the following. Open/orient the host device to which the mechanism will be docked in a normal operating position, on a table, airplane tray, lap, desk, or other suitable surface, with host device screen facing user. Decide to which side of the host device the mechanism will be attached, top-left or top-right. Position the mechanism with the lower surface of the base plate against the back (non-screen) surface of the host device, and align the two hinge clips to the top and side edges of the device. Rotate the hinge clips open, and slide first one, then the other onto the edges of the host device. Thread the phone holder (one of the jaws) onto the hinge arm, and tighten the thumb nut, pre-threaded, against the side of the phone holder to secure it in position. Insert smart device into phone holder. Using the smart device as a handle, swivel and pivot the hinge arm to any of the presentation positioning slots cut into the circular rim of the mechanism. Once a presentation slot is selected, ensure that the Hinge Arm snaps securely into the slot. To remove the mechanism from the host device, first remove the smart device from the phone holder, then rotate the hinge clips open and slide the mechanism off of the top and side edges of the host device.

Alternative versions of this mechanism may be differentiated by 1) attachment design (i.e. how does the mechanism attach to the host device), and 2) variable-positioning design (i.e. how is the smart device moved and secured to a variety of positions. Attachment Design: Alternative attachment designs may incorporate adhesives, magnets, and/or vacuum/suction technologies, in place of torsion springs and hinge clips, to enable attachment of the mechanism to one or more surfaces of the host device. Another alternative attachment design would utilize existing USB, HDMI, or other slots or gaps built into the host device, to insert the docking mechanism into one of the existing slots or gaps. Variable position design: Alternative variable-positioning designs are numerous. They may be based on circular or linear designs, and may incorporate swiveling, rotating, sliding and/or pivoting mechanisms to vary the orientation of the phone holder in any dimension. Instead of slots cut into the rim of the base plate, the design could incorporate hooks, extruded stops, magnets, friction, or locks to designate fixed presentation positions. Another alternative would use a ratcheting mechanism to enable almost any presentation position in a 360-degree rotation, similar to the rotating bezel on a wristwatch.

It should be understood, of course, that the foregoing relates to exemplary embodiments of the invention and that modifications may be made without departing from the spirit and scope of the invention as set forth in the following claims.

What is claimed is:

1. A docking apparatus comprising:
    a host mount comprising:
        a base plate;
        a connector operable to secure the base plate to a host device, wherein the connector comprises at least one hinge clip pivotally secured to the base plate by a binder post and resiliently biased towards the base plate by a spring;
        a turn table secured to an upper surface of the base plate and rotatable about a first axis relative to the base plate; and
        a hinge arm comprising a T-shape and having a pivot arm and an attachment arm extending perpendicular from the pivot arm forming the T-shape, wherein the pivot arm is pivotally attached to an upper surface of the turn table and rotatable about a second axis substantially perpendicular to the first axis; and
    a smart device mount secured to the attachment arm and operable to releasably retain a smart device.

2. The docking apparatus of claim 1, wherein the at least one hinge clip comprises a first hinge clip secured to a first end of the base plate and a second hinge clip secured to a second end of the base plate.

3. The docking apparatus of claim 2, wherein the first hinge clip is disposed at about a 90 degree angle relative to the second hinge clip.

4. The docking apparatus of claim 1, further comprising a locking mechanism operable to lock the turn table in a plurality of different positions relative to the base plate.

5. The docking apparatus of claim 1, wherein the turn table comprises an intersecting first groove and second groove, wherein the pivot arm is pivotally disposed within the first groove and the attachment arm is sized to disposed within the second groove.

6. The docking apparatus of claim 1, wherein the smart device mount comprises a pair of jaws operable to releasably secure the smart device therebetween.

7. The docking apparatus of claim 6, wherein one of the pair of jaws comprises a threaded slot, wherein the second end of the hinge arm comprises a male threaded end releasably secured within the threaded slot.

8. The docking apparatus of claim 6, wherein the pair of jaws are resiliently retained together by a band having a rubber elasticity.

9. A docking apparatus comprising:
    a host mount comprising:
        a base plate;
        a first hinge clip pivotally secured to a first end of the base plate by a first binder post and a second hinge clip pivotally secured to a second end of the base plate by a second binder post, wherein each of the first and second hinge clips are resiliently biased towards the base plate by a spring;
        a turn table secured to an upper surface of the base plate and rotatable about a first axis relative to the base plate; and
        a hinge arm comprising a first end pivotally attached to an upper surface of the turn table and rotatable about a second axis substantially perpendicular to the first axis; and
    a smart device mount secured to a second end of the hinge arm and operable to releasably retain a smart device.

10. A docking apparatus comprising:
    a host mount comprising:
        a base plate;
        a connector operable to secure the base plate to a host device;
        a turn table secured to an upper surface of the base plate and rotatable about a first axis relative to the base plate, the turn table comprising an intersecting first groove and second groove; and
        a hinge arm comprising a T-shape and having a pivot arm and an attachment arm extending perpendicular from the pivot arm forming the T-shape, wherein the pivot arm is pivotally disposed within the first groove and rotatable about a second axis substantially perpendicular to the first axis and the attachment arm is sized to be disposed within the second groove; and
    a smart device mount secured to the attachment arm and operable to releasably retain a smart device.

* * * * *